United States Patent Office 3,773,921
Patented Nov. 20, 1973

3,773,921
THERAPEUTIC COMPOSITIONS
Prabhakar Ranchhordas Sheth, Nanuet, N.Y., and Donald Melvin Stiel, Pine Brook, N.J., assignors to Hoffmann-La Roche, Inc., Nutley, N.J.
No Drawing. Filed Nov. 15, 1971, Ser. No. 199,004
Int. Cl. A61k 27/12
U.S. Cl. 424—19
6 Claims

ABSTRACT OF THE DISCLOSURE

A therapeutic composition having sustained release properties and its use in veterinary medicine is described. The composition comprises a mixture of (1) a therapeutically active sulfa drug, (2) dibasic calcium phosphate, (3) a binder and (4) a lubricant.

The composition is formulated, by conventional methods, into solid dosage forms for oral administration. When administered to ruminants, e.g., cattle and sheep, the product deposits itself in the rumen where the active ingredient is released slowly and continuously and absorbed, in like manner, into the blood stream.

BRIEF SUMMARY OF THE INVENTION

The present invention provides compositions, in solid, oral dosage form, which contain an antibacterial sulfa compound as the active ingredient. In addition to the sulfa compound, the compositions contain, as essential ingredients, dibasic calcium phosphate, a binder and a lubricant. The compositions are compressed into solid, oral dosage forms by conventional methods.

The solid, oral dosage forms which are produced in the practice of this inventnion are particularly designed for treating bacterial infections in ruminants, e.g., cattle and sheep. The products are characterized in that, when ingested by the ruminant, they deposit themselves in the rumen where the active sulfa compound is released slowly and continuously for slow and continuous absorption into the blood stream. Using the compositions of this invention, effective sulfa levels are maintained in the blood stream for up to five days after oral ingestion.

DETAILED DESCRIPTION OF THE INVENTION

The present invention is directed to novel compositions which are useful in the oral treatment of bacterial infections in ruminants. More particularly, the invention provides compositions, in solid oral dosage form, which, by a single oral administration to ruminants, achieves effective levels of a therapeutically effective sulfa compound in the blood for extended periods of time.

The compositions of the invention comprise (1) a therapeutically active sulfa compound, (2) dibasic calcium phosphate, (3) a binder and (4) a lubricant. These compositions are compressed, by conventional methods, to provide solid, shaped oral dosage forms which are suitable for administration to ruminants.

The novel boluses of the invention are characterized by being unexpectedly free of the problem of the formation of insoluble calcium salts of the active sulfa drug which has been a major disadvantage in prior bolus formulations containing such heavy materials as barium sulfate, iron and the like. These calcium salts adversely affected the efficacy of prior boluses in two ways. First, the calcium salts which formed on and adhered to the outer surface of such prior boluses materially diminished the release of active sulfa drug from the bolus after two to three days thus resulting in lower than desired blood levels. Second, as the insoluble calcium salts very slowly release active drug, the period of time required for total withdrawal of drug from the blood and milk of cattle after cessation of therapy was extended to up to approximately double the expected period. These two advantages, when considered from an economic viewpoint, are critical to the efficacy of the preparation. Additionally, as a uniformly high blood level of drug is required for about five days in the therapeutic situations contemplated herein, the decline in drug blood levels after two to three days with prior boluses presents the problem of possible re-infection after cessation of therapy.

In accordance with the present invention it has been found that a bolus formulation containing a sulfa drug and dibasic calcium phosphate, through a mechanism as yet not completely understood, is unexpectedly free from the disadvantageous formation of such insoluble calcium sulfa salts. Further, it has been surprisingly found that, in such bolus formulations, dibasic calcium phosphate is superior to, e.g., monocalcium phosphate in terms of release rate of active drug from comparable formulations. This superiority has been established in vivo by daily observation of boluses in the rumen of a cow.

In general, any sulfa compound which is effective in the treatment of bacterial infections in ruminants can be employed in the practice of this invention. Included among the sulfa compounds which are suitable for use are, for example, 3,4 - dimethyl - 5 - sulfanilamidoisoxazole (hereinafter referred to as sulfisoxazole); 5 - methyl - 3 - sulfanilamidoisoxazole (hereinafter referred to as sulfamethoxazole); 2,6 - dimethoxy - 4 - sulfanilamidopyrimidine (hereinafter referred to as sulfadimethoxine); 5,6-dimethoxy - 4 - sulfanilamidopyrimidine (hereinafter referred to as sulfadoxine); 4,6 - dimethyl - 2 - sulfanilamidopyrimidine (hereinafter referred to as sulfamethazine), etc. A single sulfa compound can be used or a mixture thereof can be employed. Salts of the sulfa compound with a medicinally acceptable base, e.g., sodium salt, potassium salt, etc., can be used, if desired. Additionally, the sulfa compound can be employed in admixture with a compound that potentiates its therapeutic activity. In any event, it is to be understood that the foregoing listing is illustrative only and is not intended as limitative on the scope or practice of the invention. Other such sulfa compounds as described above are equally well suited for use in the practice of the invention. In the preferred embodiment of the invention, however, compositions containing sulfadimethoxine are produced.

As indicated heretofore, the compositions of this invention contain, as an essential ingredient, a binder material. In general, any non-toxic material, which is soluble in ethyl alcohol or isopropyl alcohol and which is conventionally used in producing oral pharmaceutical dosage forms, can be employed. Thus, for example, binders, such as ethyl cellulose, polyvinyl pyrrolidone or the like are suitable for use.

In general, any non-toxic material which has utility as a lubricant in formulating pharmaceutical tablets can be employed in the practice of this invention. Included among the compounds which are suitable for use as lubricants are, for example, stearic acid, calcium stearate, magnesium stearate, talc, mono-, di-, triglycerides, etc.

The quantities of the various essential ingredients used in the practice of the invention are variable within certain prescribed limits. Thus, for example, the active sulfa compound can comprise from about 20% to about 80% of the total weight of the final product. Similarly, dibasic calcium phosphate can comprise from about 10% to about 70% of the total weight of the final product. Therefore, the combined weight of sulfa compound and dibasic calcium phosphate in the product shall not be less than about 30% of the weight, and not more than about 98.5% of the weight, of the final product. The compositions which are produced in the preferred practice of the invention will contain from about 40% to about 60% by weight of the sulfa compound and from about 40% to about 60% by weight of the dibasic calcium phosphate, with the proviso that the combined weight of sulfa compound and dibasic calcium phosphate shall not be less than about 80% of the weight, and not more than about 98.5% of the weight, of the preferred final product.

The quantity of binder material and the quantity of lubricant used in the practice of the invention is similarly variable within certain prescribed limits. Thus, the combined weight of binder and lubricant will be not less than about 1.5% of the weight, or more than 20% of the weight, of the final product. The lubricant can comprise from about 0.5% to about 19.0% of the weight of the final product while the binder can comprise from about 1.0% to about 19.5% of the weight of the final product. It is preferred to utilize as a binder a mixture of from about 70% to 95% by weight polyvinyl pyrrolidone and from about 5% to 30% by weight ethyl cellulose.

In addition to the essential components enumerated heretofore, the compositions of the invention can contain, as optional ingredients, substances which are conventionally used in formulating pharmaceutical tablets. Such optional components include, for example, lactose, pregelatinized starch, microcrystalline cellulose and the like. Non-toxic coloring substances can also be employed. Additionally, preservatives can be incorporated into the products, if desired.

The compositions of this invention are readily produced. In the preferred procedure, appropriate quantities of the active sulfa compound and dibasic calcium phosphate, optionally with the addition of a suitable coloring agent, are thoroughly blended and passed through a suitable grinding mill. In a separate vessel, a solution of the binder in ethyl alcohol or isopropyl alcohol is prepared. Dissolution of the binder in the solvent can be accomplished at any temperature ranging from room temperature to the boiling point of the solvent in use. In the preferred embodiment of the invention, the solution is prepared by heating at a temperature of from about 50° C. to 60° C. The concentration of the binder solution which is produced in this step of the process is variable within certain prescribed limits. For example, a solution containing from about 5% to about 40% by weight of binder can be produced and used in carrying out the invention. In the preferred embodiment of the invention, a solution containing from about 10% to about 30% by weight of binder is employed. If a preservative is to be used, it can be incorporated into the system as a component of the binder solution. The binder solution is added to, and mixed with, the sulfa compound-dibasic-calcium phosphate-containing mixture prepared in the first step of the process. If needed to produce a satisfactory granulation, additional alcohol can be added to the mixture. The granulation, which is thus obtained, is thereafter dried at a temperature elevated above room temperature. While the drying temperature is not critical, it has been found that satisfactory results are achieved when the product is dried at a temperature within the range of from about 105° F. to about 130° F. After drying, the granulation is passed through a conventional grinding mill, following which it is blended with a suitable amount of a lubricant and compressed, by conventional means, into the desired solid dosage form. In the preferred practice of the invention, the granulation will be compressed into a bolus suitable for ingestion by a ruminant. It is to be understood, however, that the present invention is not limited to the production and use of a bolus-shaped dosage form. The granulation can be compressed, if desired, into large size tablets or into spheres.

It is to be understood that the preparative methods set forth herein are exemplary only and the disclosure thereof is not intended to limit the scope or practice of the invention. Variations in the heretofore described procedures, as well as alternate methods for producing the products of this invention, will be readily apparent to persons skilled in the art.

As indicated heretofore, the present invention provides solid oral dosage forms suitable for use in the treatment of bacterial infections in ruminants. The active ingredient of the compositions is a sulfa compound and the efficacy of sulfas as antibacterials is well known. The present invention provides the sulfa drug in a dosage form which has highly desirable sustained release characteristics. Detectable levels of the sulfa compound have been found to be present in the blood stream of the ruminant for up to eight days after the ingestion of a product produced as described herein. This feature is of significant importance since the ruminant can be treated for a bacterial infection with a single dose of the compositions of this invention with the assurance that for an extended period of time the active sulfa compound will be constantly present to treat and/or eliminate the infections. The sustained release characteristics of the present products obviate the necessity of administering sustaining doses of the sulfa drug during the period of treatment in order to provide adequate blood levels throughout the period. By being free from the formation of calcium sulfa drug salts on the outer surface, which is a major disadvantage in prior boluses, the improved boluses of the invention sustain an active blood level of sulfa drug over the required period of time, i.e., usually 5 days. Further, as there is no undue retention of drug in the bolus due to presence of insoluble calcium sulfa drug salts with the improved boluses of the present invention, prompt and complete withdrawal of drug after cessation of treatment is an advantage thereof.

In unit dosage form, the compositions of the invention will contain from about 2.5 grams to about 25.0 grams of the active sulfa compound or the equivalent amount of a salt thereof with a medicinally acceptable base. In the preferred embodiment, boluses weighing from 25 grams to 35 grams, preferably about 27 grams, are provided containing from about 9.0 grams to 15 grams, preferably 12.5 grams of the active sulfa compound or the equivalent amount of a salt thereof with a medicinally aceptable base. The manner in which the product is used will be readily apparent. In general, in a typical treatment of a bacterial infection in ruminants using a bolus containing, for example, 12.5 grams of the sulfa compound one such bolus for each 200 pounds of body weight will be fed to the animals as a single dose.

For a fuller understanding of the nature and objects of this invention, reference may be had to the following examples which are given merely as further illustrations of the invention and are not to be construed in a limiting sense. All parts given in the examples are parts by weight unless otherwise indicated.

Example

In this example 12.75 parts of sulfadimethoxine, 0.01 part of a fine particulate mixture of ferric oxide and talc marketed under the trade name Lo-Micron-Pink by Whitaker, Clarke and Daniels and 13.34 parts of dibasic calcium phosphate were charged into a suitable vessel and intimately blended therein. The mixture was then passed through a Fitzpatrick comminuting machine operating at high speed, No. 1 hammers forward.

To a total of .51 part of polyvinyl pyrrolidone as a 10% weight to volume solution in isopropanol was added 0.09 part ethylcellulose, 45 cps., and the whole mixed thoroughly at high speed. This solution was then added to the sulfadimethoxine-dibasic calcium phosphate powder, an additional two parts of isopropanol was added and, by thorough mixing, a granulation was obtained.

The granulation was tray dried in an oven at a temperature of between 110° F. and 120° F. for a period of about eighteen hours. The dry granules were passed through a Fitzpatrick comminuting machine operating at slow speed, equipped with a No. 2A screen, knives forward. The milled granulation was then thoroughly blended with 0.30 part of magnesium stearate and the mixture compressed into boluses weighing 27 grams. Each bolus thus prepared contained 12.5 grams of sulfadimethoxine, plus a 2% excess.

The release characteristics of boluses produced as described in the preceding paragraphs were compared with those of boluses containing sulfadimethoxine in a non-sustained release type formulation. The non-sustained release bolus used contained the following named ingredients in the quantities indicated:

| Ingredients: | G./bolus |
|---|---|
| Sulfadimethoxine (1% excess) | 15.15 |
| Pregelatinized starch | 2.01 |
| Gelatin | 0.45 |
| Alginic acid | 0.30 |
| Magnesium stearate | 0.09 |

The non-sustained release bolus was produced by admixing sulfadimethoxine, pregelatinized starch and gelatin and granulating the mixture with distilled water. The wet mass was passed through a grinding mill and the granules were dried at a temperature of 110° F. The dried granules were passsed through a grinding mill and magnesium stearate and alginic acid were added thereto and mixed therein. The granulation was then compressed into boluses each weighing 18 grams and containing 15 grams of sulfadimethoxine plus a 1% excess.

Twelve animals, i.e., cows were used in evaluating the product of this example, while in the case of the non-sustained release bolus only six test animals, i.e., cows, were used. In the caseof the sustained release product of this example, the bolus was administered only once at the start of the test. In the case of the non-sustained release bolus, the product was administered at the start of the test and sustaining doses were administered at 24, 48 and 72 hours after the start of the test. The release characteristics of each product were evaluated on the basis of the quantity of sulfadimethoxine present in the blood stream of the test animals at various times during the test period. Sulfadimethoxine assays were carried out on plasma rather than on whole blood using a modification of the procedure of A. C. Bratton and E. K. Marshall, Jr. described in the Journal of Biological Chemistry, vol. 128, p. 537 (1937).

The results of this experimentation are shown in the tables which are set forth hereinafter. The body weight of the test animal in kilograms, the dose given to the animal mg./kg. of body weight are set forth in the headings of the tables. The sulfonamide levels in the plasma, at the indicated periods of time, are set forth in the body of the tables in parts per million. Table I relates to the experiment as carried out using the product of this example. Table II relates to the experiment as carried out using the non-sustained release, sulfadimethoxine-containing bolus in which the animal received the medication at the beginning of the test and a sustaining dose at 24, 48 and 72 hours after the start of the test.

TABLE 1

Sulfadimethoxine (p.p.m.) in blood plasma

| | Animal number | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | |
| | Body weight in kilograms | | | | | | | | | | | | |
| | 286 | 250 | 250 | 250 | 250 | 268 | 227 | 223 | 232 | 261 | 223 | 241 | |
| | Dosage (mg./kg.) | | | | | | | | | | | | |
| Hours | 131 | 150 | 150 | 150 | 150 | 140 | 165 | 168 | 162 | 144 | 168 | 156 | Average |
| 4 | 30 | 45 | 40 | 35 | 30 | 36 | 54 | 30 | 53 | 33 | 41 | 38 | 39 |
| 8 | 51 | 83 | 56 | 73 | 43 | 70 | 65 | 56 | 90 | 65 | 73 | 70 | 66 |
| 12 | 72 | 93 | 73 | 81 | 51 | 87 | 73 | 62 | 108 | 87 | 83 | 81 | 79 |
| 24 | 70 | 106 | 87 | 102 | 60 | 104 | 83 | 89 | 112 | 91 | 87 | 93 | 90 |
| 48 | 45 | 77 | 66 | 73 | 66 | 87 | 66 | 49 | 104 | 95 | 60 | 80 | 72 |
| 72 | 40 | 56 | 55 | 45 | 33 | 43 | 43 | 40 | 60 | 81 | 48 | 50 | 50 |
| 96 | 37 | 46 | 43 | 41 | 37 | 28 | 31 | 46 | 25 | 62 | 41 | 43 | 40 |
| 120 | 56 | 50 | 33 | 60 | 35 | 42 | 18 | 38 | 30 | 65 | 56 | 56 | 45 |
| 144 | 35 | 15 | 25 | 38 | 23 | 11 | 3 | 28 | 6 | 33 | 38 | 31 | 24 |
| 168 | 14 | 3 | 22 | 10 | 8 | 3 | ND | 10 | ND | 10 | 41 | 10 | 11 |

Note.—ND = Not detectable.

TABLE 2

Sulfadimethoxine (p.p.m.) in blood plasma

| | Animal number | | | | | | |
|---|---|---|---|---|---|---|---|
| | 1 | 2 | 3 | 4 | 5 | 6 | |
| | Body weight in kilograms | | | | | | |
| | 419.5 | 460.0 | 456.4 | 533.6 | 631.4 | 504.1 | |
| Hours | Dosage[1] | Dosage[1] | Dosage[1] | Dosage[1] | Dosage[1] | Dosage[1] | Average |
| 6 | 57 | 35 | 29 | 33 | 51 | 35 | 40 |
| 12 | 78 | 67 | 63 | 51 | 75 | 78 | 68.7 |
| 24 [2] | 45 | 45 | 48 | 36 | 42 | 58 | 45.7 |
| 36 | 54 | 57 | 57 | 48 | 54 | 70 | 56.6 |
| 48 [2] | 29 | 27 | 29 | 24 | 28 | 37 | 29.0 |
| 60 | 44 | 48 | 52 | 44 | 51 | 61 | 50.0 |
| 72 [2] | 23 | 28 | 31 | 20 | 28 | 34 | 27.3 |
| 96 | 25 | 27 | 32 | 23 | 29 | 33 | 28.1 |
| 120 | 4 | 4 | 6 | 2 | 4 | 5 | 4.2 |
| 144 | 0.41 | 0.43 | 0.29 | 0.33 | 0.48 | 0.35 | 0.38 |
| 168 | 0.15 | 0.13 | 0.20 | 0.10 | 0.13 | 0.17 | 0.15 |

[1] Initial dosage of 55 mg./kg.
[2] Sustaining dosage of 27.5 mg./kg. each.

From the foregoing, it is readily apparent that the release characteristics of the product of this example are such that sulfonamide (sulfadimethoxine) levels in blood plasma are maintained over a considerable period of time. The sulfonamide levels achieved with this product were entirely comparable to those achieved with the non-sustained release product (administered at 55 mg./kg. at the start of the test with sustaining doses of 27.5 mg./kg. each at 24, 48 and 72 hours after the initial dose).

We claim:

1. A solid, sustained release, therapeutically active unit dosage form for veterinary use in ruminants consisting essentially of (1) from about 40% to about 60% by weight of a therapeutically active sulfa compound or a salt thereof with a medicinally acceptable base, (2) from about 40% to about 60% by weight dibasic calcium phosphate, (3) a non-toxic binder comprising a mixture of polyvinyl pyrrolidone and ethyl cellulose and (4) a non-toxic pharmaceutical tabletting lubricant, with the proviso that the combined weight of said sulfa compound and dibasic calcium phosphate comprises not less than about 80% and not more than about 98.5% by weight of said dosage form, said dosage form being characterized by release of all of said sulfa drug over a period of about five days post ingestion and by being substantially free from the formation on its surface of insoluble calcium salts of said therapeutically active sulfa compound in the rumen.

2. The unit dosage form of claim 1 wherein each such dosage form weighs from about 25 grams to about 35 grams.

3. The composition in accordance with claim 1, wherein said sulfa compound present is sulfadimethoxine.

4. The composition in accordance with claim 1, wherein said sulfa compound is sulfamethoxazole.

5. The composition in accordance with claim 1, wherein said sulfa compound is sulfisoxazole.

6. The composition in accordance with claim 1, wherein said sulfa compound is sulfamethazine.

References Cited
UNITED STATES PATENTS

| | | | |
|---|---|---|---|
| 3,134,719 | 5/1964 | Sheth et al. | 424—229 |
| 3,577,514 | 5/1971 | Robinson | 424—22 |
| 3,495,000 | 2/1970 | Merabi et al. | 424—22 |
| 3,507,952 | 4/1970 | Rednick et al. | 424—22 |
| 3,535,419 | 10/1970 | Siegrist | 424—22 |

FOREIGN PATENTS 936,386  9/1963  Great Britain.

SHEP K. ROSE, Primary Examiner

U.S. Cl. X.R.

424—22, 229